Figure 1:
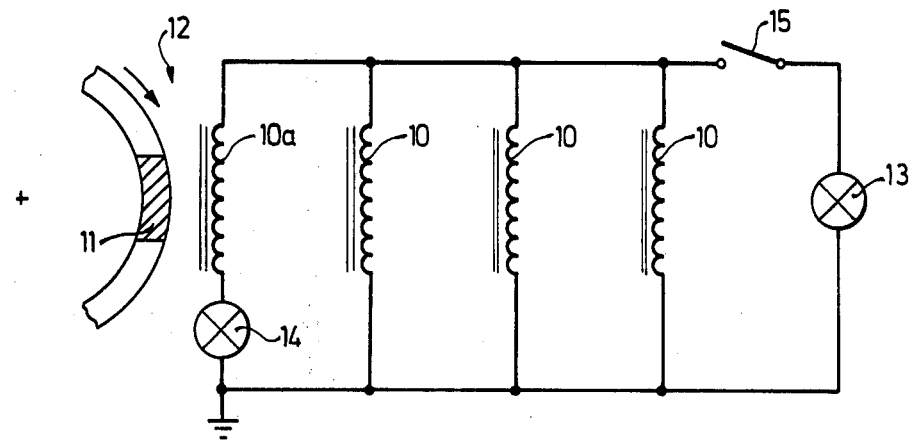

United States Patent [19]

Hirt et al.

[11] 3,971,977

[45] July 27, 1976

[54] MAGNETO GENERATOR SUPPLIED BATTERY-LESS ELECTRIC POWER SUPPLY SYSTEM PARTICULARLY FOR MOTOR VEHICLES

[75] Inventors: Adam Hirt, Wachendorf; Herbert Roderer, Nurnberg, both of Germany

[73] Assignee: Robert Bosch G.m.b.H., Stuttgart, Germany

[22] Filed: Feb. 14, 1975

[21] Appl. No.: 549,992

[30] Foreign Application Priority Data

Feb. 27, 1974 Germany............................ 2409365

[52] U.S. Cl.................................... 322/1; 307/16; 310/70 R; 315/78; 322/90; 240/7.6
[51] Int. Cl.² ........................ B60Q 1/26; B62J 5/06
[58] Field of Search ..................... 322/1, 90, 91, 95; 307/16; 315/78; 240/7.6; 310/70, 153

[56] References Cited
UNITED STATES PATENTS 3,029,378 4/1962 Carlsson ............................. 322/90
3,377,486 4/1968 Benezech........................... 307/16 X

*Primary Examiner*—J D Miller
*Assistant Examiner*—Robert J. Hickey
*Attorney, Agent, or Firm*—Flynn and Frishauf

[57] ABSTRACT

To supply electrical power to small motor vehicles such as motorcycles, motor scooters, snow-mobiles and the like, which do not have a battery, to energize separate loads such as headlights and tail-lights, a permanent magnet field generator having a plurality of armature windings has loads, for example the main headlight connected, in series with a control switch, across all the armature power supply windings; one of those power supply windings has, additionally, the tail-light connected in series therewith, and in advance of the switch connection, so that upon burn-out of the main load (for example the headlight) no excess voltage peaks will develop which also destroy the other load, for example the tail-light.

8 Claims, 2 Drawing Figures

MAGNETO GENERATOR SUPPLIED BATTERY-LESS ELECTRIC POWER SUPPLY SYSTEM PARTICULARLY FOR MOTOR VEHICLES

The present invention relates to an electrical power supply system in which a generator provides electrical power to a plurality of independent loads, without a floating battery, as installed, for example, in small vehicles such as motorcycles, motor scooters, snow-mobiles and the like, to supply electrical energy for headlights, tail-lights, and similar applications, selectively controlled by switches.

Battery-less electrical power supply systems frequently use a magneto generator, having a permanent magnet field which operates with a plurality of armature windings, usually connected in parallel, in which voltages are induced. Such systems, particularly in small vehicles not having batteries, require that sufficient power is available for headlights, tail-lights and the like, which are controlled by suitable switches.

It has previously been proposed to connect lamps to be switched directly through a main light switch to generator windings (see, for example, German Patent 576,298). This solution has the disadvantage that comparatively long electric supply wires are needed, which cause a comparatively high voltage drop in the lines themselves. For example, to permit handy operator control, the switch is located on, or near, the handlebars of a motorcycle. Connection of the tail-light then requires a control line from the tail-light the length of the motorcycle to the handlebars and back again to the tail-light, that is, an electric wire connection extending twice the length of the vehicle and, inherently, having a voltage drop therein. This circuit has a further disadvantage, namely that when one of the lamps, typically the main headlight, should burn out, the system will be subject to a voltage rise. Thus, a defect in one of the lamps, or at a supply connection, or switch terminal thereto, may cause burn-out of all the other lamps on the vehicle due to the increased voltage being supplied, when one of the design loads is not present.

It has also been proposed to provide a magneto generator with a main armature and an auxiliary armature, the auxiliary armature carrying the generator winding for auxiliary loads, for example for the tail-light of a vehicle, and being connected directly to the auxiliary armature. The two armatures are connected, inductively, in parallel, due to the rotating magnet system of the generator. Thus, when the main armature is loaded (that is, when the main headlight, for example, is connected by a switch), magnetic flux affects the auxiliary armature, providing voltage for the tail-light. When the main armature is turned off, or should burn out, then the tail-light is also disconnected because the flux pattern changes; the tail-light does not, however, burn out. This solution has the desired effect, but requires a good deal of space in the armature construction, is complicated to build, and the auxiliary armature must be separately manufactured and additionally secured to the main armature. This system is described, for example, in German Utility Model 1,853,031.

It is an object of the present invention to simplify the power supply system for small vehicles using magneto-type generators, in which, for example, a main headlight is connected through a switch to a magneto generator and in which additional loads, for example tail-lights, license plate lights and the like are commonly controlled by switching of the main load or headlight without, however, requiring excessive wire lines, or resulting in excessive voltages upon disconnection of the main load.

SUBJECT MATTER OF THE PRESENT INVENTION

Briefly, one of the loads — typically the main load or headlight of the vehicle — is connected to a plurality of generator windings over a switch, the main load being connected in parallel to all the load generator windings. At least one of the generator windings, in advance of the switch (or parallel) connection is additionally connected in series to the second load. This second load, typically, may be the tail-light, or license plate light of the vehicle, and be connected in series with only one of the plurality of armature windings.

Figure 2:
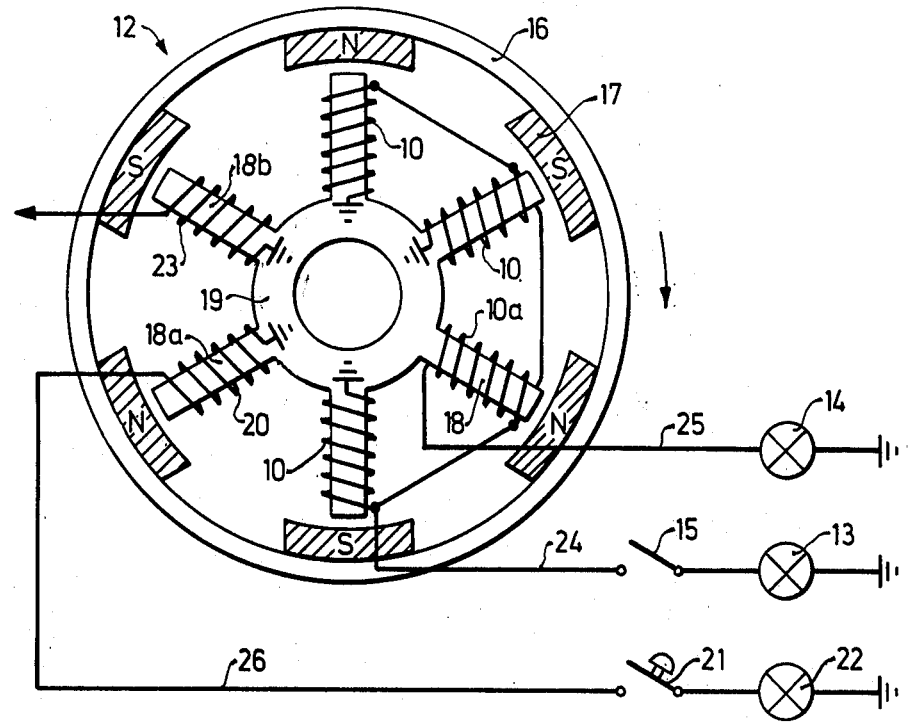

The invention will be described by way of example with reference to the accompanying drawings, wherein:

FIG. 1 is a schematic electrical diagram of the power supply system in accordance with the present invention; and FIG. 2 is a highly schematic transverse partly cross-sectional view through a magneto generator having a star-shaped armature with various armature windings located thereon, as well as their connections to loads.

The circuit illustrated in FIG. 1 is powered by a magneto generator 12 which is electromagnetically coupled to a rotating permanent magnet field 11. The magneto generator has four power windings 10, 10', 10'' and 10a, all electromagnetically, inductively coupled to field 11, as symbolically shown in FIG. 1. Two lamps are connected to the power supply system. Lamp 13 is the main headlight; lamp 14 is the tail-light - license plate light. The main headlight 13 can be connected to the generator windings 10, 10', 10'', 10a over headlight switch 15. When switch 15 is closed, the lamp 13 is connected in parallel to all the windings. The tail-light lamp 14, in contrast, is connected in series with generator winding 10a, and in advance of the parallel connection of the other windings 10, 10', 10'' of the armature. The parallel connected generator windings 10, 10', 10'' as well as 10a have one terminal of similar polarity connected together, and to a terminal of the light switch 15. The two lamps 14, 15 as well as the generator windings 10, 10', 10'' have one terminal connected to chassis, or ground, of the vehicle.

Magneto 12 is rotated by an internal combustion engine, not shown.

OPERATION

The permanent magnet field 11 is rotated in the direction of the arrow 11' by the internal combustion engine; as a result, voltages of equal magnitude and direction are induced in the generator windings 10, 10', 10'', 10a. If the main light switch 15 is open (as shown in FIG. 1), then these voltages will buck each other, and no current will flow through the windings; if the windings are symmetrically located, and wound, there will be no circulating currents. The tail-light lamp 14 thus will not have current flowing therethrough and will remain extinguished.

Upon closing of main light switch 15, current will be supplied to the main head lamp 13 since the circuit is closed for all the generator windings 10, 10', 10'' and 10a. The current flowing through the main lamp 13 is a combination of the various branch currents generated by the respective generator windings 10, 10', 10'' and 10a. The branch current flowing through the generator winding 10a additionally supplies power to the tail lamp 14. Tail lamp 14 forms an additional load which is in series with the winding 10a. The branch current through winding 10a thus will be somewhat less than the branch currents through the other generator windings 10, 10', 10'' (since the overall resistance in the branch of winding 10a and lamp 14 is higher, with switch 15 closed, than the resistance of the other branches of the armature). The smaller branch current in the generator winding 10a, however, causes a higher voltage at the output of the generator winding 10a. This voltage difference between the generator winding 10a and the generator windings 10, 10', 10'' is the voltage drop across the tail lamp 14, for which this lamp should be designed.

In case of malfunction, that is, for example if the main headlight lamp 13 should burn out (or the switch should become defective), the tail-light lamp 14 is still protected against over-voltages, even though the tail-light lamp 14 is connected directly to the magneto 12. Upon burn-out of the main headlight lamp 13, no current will flow through the generator windings 10, 10', 10'' and 10a, and the voltage relationships will be identical to the condition when switch 15 is open, that is, the no-load voltages of all generator windings will be equal and therefore the tail lamp 14 will likewise extinguish. If the tail light lamp 14 should burn out, then the generator winding 10a no longer will have current flow therethrough, that is, it will be unloaded. The main headlight lamp 13 will then be supplied only from the remaining generator windings 10, 10', 10''. These generator windings are loaded slightly more than when all four windings (including winding 10a) are connected, so that the output voltage will be somewhat less, thus providing less voltage to the headlight, but still permitting its operation, and giving the operator of the vehicle an indication that the tail-light has burned out.

The structure of a magneto generator embodying the invention is seen in FIG. 2. The magneto generator 12 has an external rotor 16, rotating in direction of the arrow 16', supplied with a magnetic system having six permanent magnets 17. These magnets are shown as separate elements although, of course, they may be a continuous ring which is suitably magnetized. The pole relationships of the field are indicated in FIG. 2, alternating between North and South poles. Generator windings 10, 10', 10'', 10a are connected in parallel to each other and located on four of six star-shaped radially extending salient armature elements. The star-shaped armature elements 19, on which the windings 10, 10', 10'' and 10a are located, are surrounded by the six-pole external rotor field 16. The two free armature elements 18a and 18b have a generator winding 20, and a winding 23, respectively, wound thereon. Generator winding 20 connects to a brake light line 26 to energize a brake light 22 over a brake light switch 21. Winding 23 on armature element 18b supplies the ignition system for the internal combustion engine with which the magneto 12 is connected. The ignition system is not shown. The windings 10, 10', 10'' and 10a are, alternately, wound in opposite winding directions, since they are opposed by permanent magnets 17 of alternately opposite polarity. Thus, the parallel-connected voltages induced in the windings on the armature elements 18 are always in phase. The main or headlight lamp 13 is connected over main light switch 15 to the supply line 24 and to the common connection of the generator windings 10, 10', 10'' and 10a. The tail-light lamp 14 is connected over a supply line 25 directly to the free end of the generator winding 10a. The other terminals of generator windings 10, 10', 10'' are connected to chassis, as are also the other terminals of the headlight and of the tail-light. The operation of the magneto of FIG. 2 is identical to that described in connection with FIG. 1.

The present invention is not limited to the example described since the magneto generator can be constructed in many different ways and forms. The essence of the present invention, however, is to utilize at least one generator winding with a direct series connection of one load, in combination with a further generator winding (or windings) which has (or have) voltages of equal phase induced therein, all of the generator windings being connected in common over a switch to a further load. The number of loads and the number of windings supplying any one of the loads will, of course, depend on the load, space availability, and design requirements.

We claim:

1. Generator electric power supply system, particularly for motor vehicles without batteries to supply at least two loads (13, 14) and having a control switch (15) for selectively connecting at least one of the loads (13) to the supply system, in which the supply system comprises a permanent magnet field (11) generator (12) having a plurality of armature windings (10, 10', 10'', 10a) connected in parallel and in electromagnet coupled relation to the field (11), the improvement comprising the circuit combination of one of the loads (13) and said switch (15) being connected in series and the series connection (13, 15) of the load-and-switch being connected in parallel to said generator windings (10, 10', 10'', 10a) with a second load (14) being connected in series with at least one of the generator windings (10a) and in advance of the connection of said at least one generator winding (10a) to the parallel connection of the other generator windings (10, 10', 10''), said generator windings being located relative to said field (11) to have in-phase voltages induced therein.

2. System according to claim 1, wherein said second load (14) is connected in series with one of the generator windings (10a).

3. System according to claim 1, wherein the generator windings (10, 10', 10'', 10a) have one terminal of equal polarity connected together and additionally to one terminal of the switch (15); one terminal, each, of both said loads being connected in common, and to the ground, or chassis connection of the system; and those generator windings (10, 10', 10'') which are not connected in series with said second load have their other terminal connected to ground, or chassis of the system.

4. System according to claim 3, wherein one of the loads (13) is the headlight of a vehicle and the second load (14) is the tail-light of the vehicle.

5. System according to claim 4, wherein the second load (14) forming the tail-light of the vehicle is connected in series to one of the windings (10a) of the generator.

6. System according to claim 4, wherein the generator comprises a salient pole armature having six radially projecting pole elements (18, 18a, 18b), the generator windings (10, 10', 10'', 10a) being located on four (18) of the six armature elements;

and wherein the field comprises a six-pole permanent magnet field element (16).

7. System according to claim 6, wherein the field is an external rotor field having inwardly directed, alternately located poles (17), the armature being located centrally of the external rotor field and having radially outwardly projecting pole elements.

8. System according to claim 6, wherein the two remaining armature elements (18a, 18b) each have an armature winding (20, 23) applied, the vehicle has a brake light, and an ignition system, one of the armature windings (20) being connected to the brake light (22) and the other armature winding (23) being connected to the ignition system.

* * * * *